Patented Feb. 16, 1937

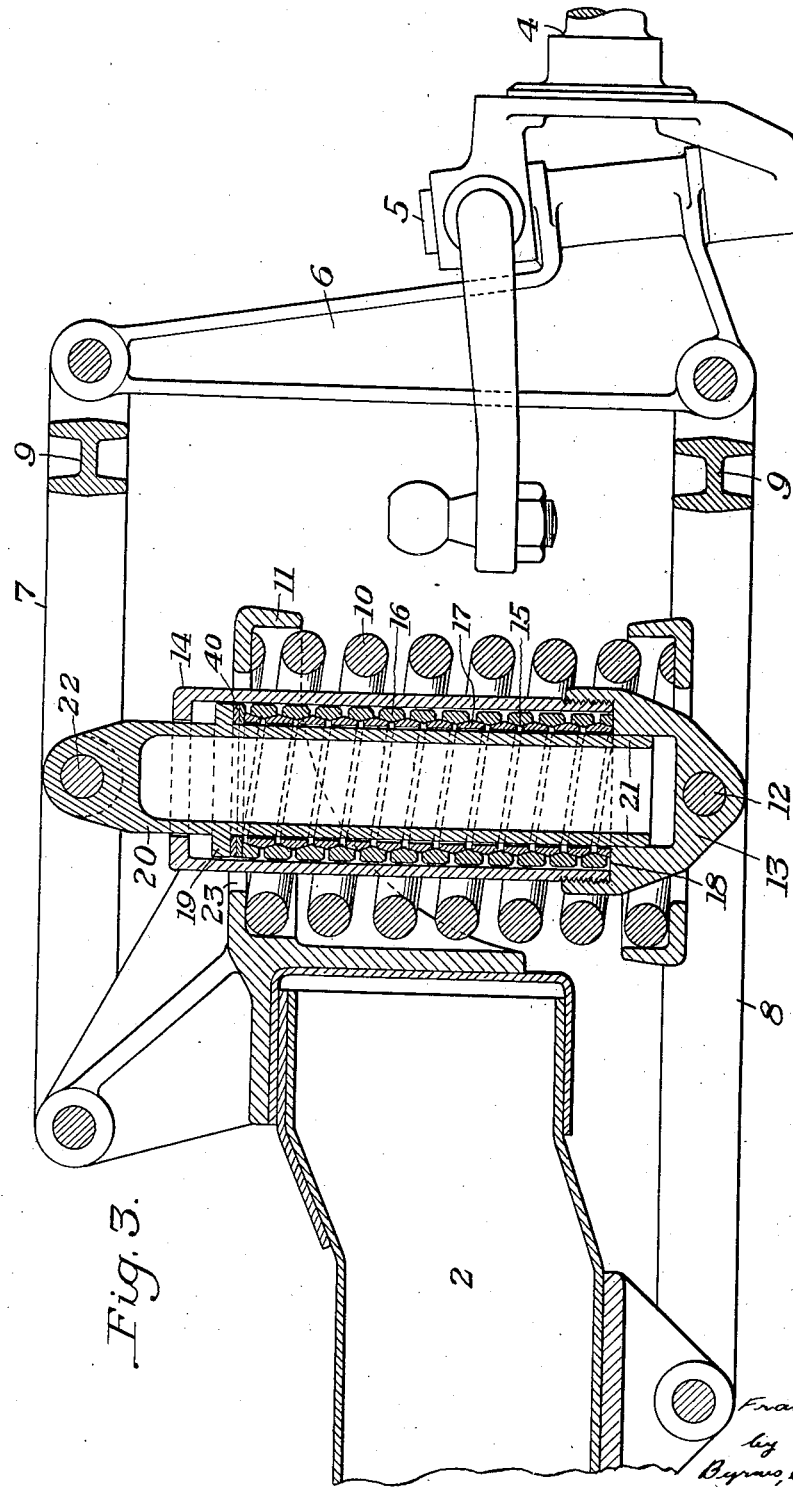

2,070,775

UNITED STATES PATENT OFFICE 2,070,775

MOUNTING FOR VEHICLE WHEELS

Frank B. Bell, Pittsburgh, Pa.

Application January 30, 1935, Serial No. 4,071

14 Claims. (Cl. 267—20)

This invention relates to mountings for vehicle wheels and is herein particularly described as applied to the individual springing of front wheels for automobiles.

The problem of springing an automotive vehicle so as to absorb road shocks and eliminate discomfort to the passengers resulting from such shocks and spring reactions has occupied the attention of automotive engineers for years past, and many schemes have been proposed. The present invention provides a simple and effective system whereby the road shocks are absorbed or dissipated and the mechanism employed is simple, compact and not likely to get out of order.

It has heretofore been proposed to mount the front wheels of an automobile each on an individual wheel-supporting member, which supporting member is connected to the frame by spaced links permitting up and down movement of the wheel-supporting member relative to the frame. In these structures a load spring has been interposed between the frame and one of the links. The apparatus so far described is insufficient to meet modern requirements and various forms of shock absorbing mechanism have been applied. Generally speaking, these have not been entirely satisfactory from the standpoint of riding quality or manufacturing convenience and cost.

The present invention provides a shock absorber which is connected only to those parts of the mechanism that move with respect to the frame. Preferably it is connected between the supporting links in such manner as to operate on differential movement of the links, but the advantages of the invention can be obtained to some degree by connecting it between a link and the wheel-supporting member so as to operate on differential movement of such parts. It is desirable, however, that the connection shall be between points whose differential movement is relatively small compared with the total movement of the wheel-supporting member with respect to the frame because in this way the amount of travel in the shock absorber unit may be made quite small and it is therefore possible to use a spring of high capacity and short travel. Such spring is effective for absorbing the shocks of large magnitude which are encountered when the car is traveling over rough roads, and yet because of the small amount of movement involved in moderate movements of the wheel-supporting member relative to the frame when the car is traveling over smooth roads, the shock absorbing spring, despite its high capacity, does not unduly "stiffen" or interfere with the smooth working of the wheel suspension system.

I further improve the operation of the device by so mounting the links that the wheel-supporting member, instead of moving in a vertical plane, moves in a plane at an angle to the vertical. This arrangement, especially when combined with my improved shock absorbing mechanism, greatly reduces road shocks.

In the accompanying drawings illustrating a present preferred embodiment of the invention, Figure 1 is a front view showing the frame, the wheel and the wheel mounting;

Figure 3 is a view to enlarged scale, partly in section, taken on the line III—III of Figure 2.

Figure 1:
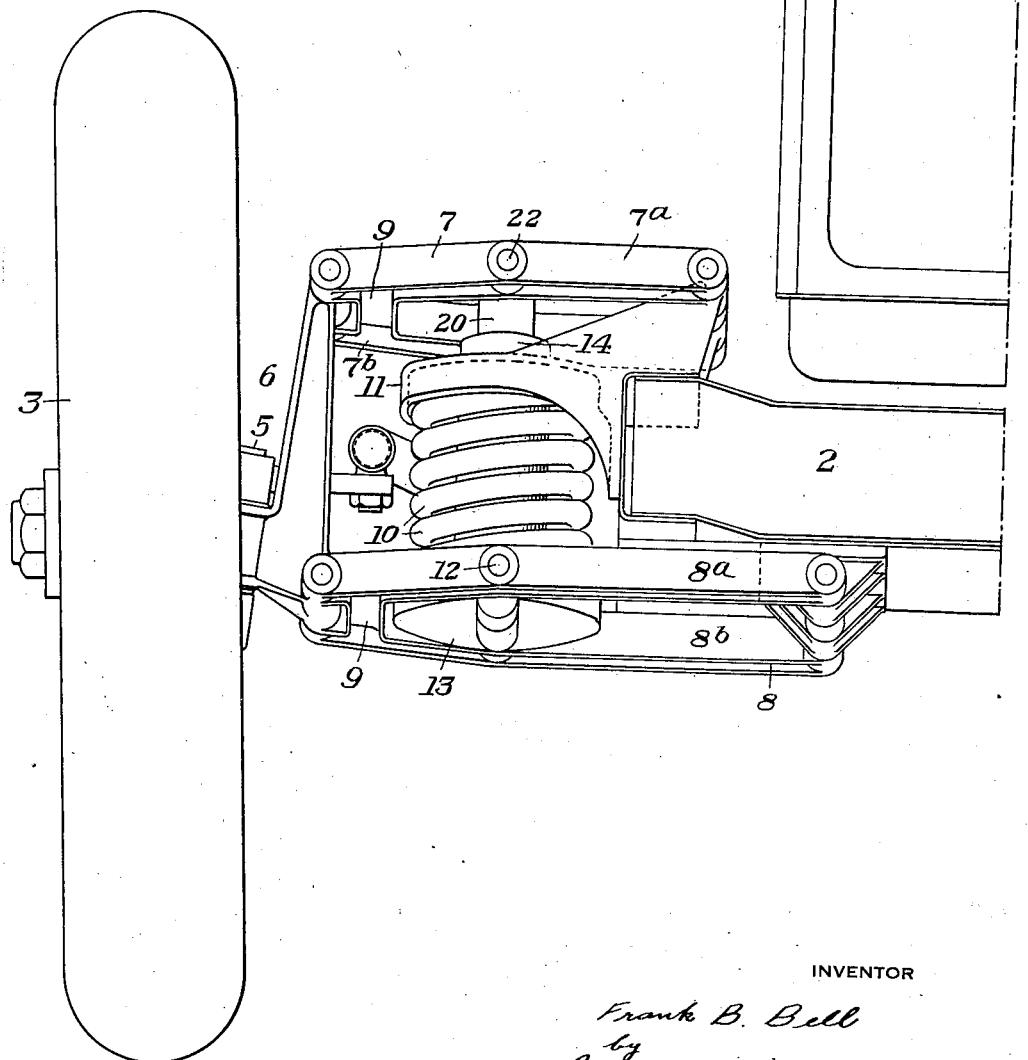

Referring to the drawings, there is shown a frame 2 which is supported by a wheel 3 mounted on a spindle 4. The spindle is carried on a king pin 5 mounted in a wheel-supporting member 6. The wheel-supporting member 6 is connected to the frame 2 by an upper link 7 and a lower link 8. Each of these links is U-shaped having arms 7a, 7b and 8a, 8b connected to one another at 9. It will be noted that the upper link 7 is shorter than the lower link 8. This is a well known expedient to prevent "scrubbing" of the tires on up and down movement of the wheel relative to the frame.

A helical load spring 10 is interposed between a bracket 11, carried on the frame 2, and the link 8. This spring is initially under a load corresponding to that portion of the weight of the car and its passengers which is carried by the wheel in question, and of course expands and contracts as the car is moving. The action of this spring must be controlled if the desired riding qualities are to be obtained. This is done by my improved mechanism which will now be described.

A pivot pin 12 is provided in the link 8 intermediate its ends and a cap 13 is mounted on such pin. A shell 14 is threaded into the cap and provides a housing for the shock absorbing spring 15. This spring may be of any suitable type, but I have shown a friction spring consisting of an outer coil 16 and an inner coil 17. The two coils have tapered engaging faces. A spring of this general character is shown in Harvey Patent 758,066. Such spring may be of very high capacity and short travel. The lower end of the spring bears against a face 18 inside the cap 13, and the other end bears against a flange 19 on a spring engaging member 20. The member 20 has a stem portion 21 which extends within the shock absorbing spring and prevents undue sidewise deflection thereof. The member 20 is pivotally connected to the upper link 7 by means of a pivot pin 22.

It will be noted that an opening 23 is provided in the bracket 11 and that the shock absorbing mechanism extends through this opening and lies within the load spring 10. This arrangement is quite satisfactory because of its compactness and also because it permits of locating the shock absorber advantageously to obtain the desired amount of differential movement.

On any movement of the wheel-supporting member 6 relative to the frame 2 there will be a differential movement between the pin 12 and the pin 22. This differential movement will be quite small in comparison with the movement of the wheel-supporting member 6 and, as stated, this permits of using a high capacity spring of short travel.

The load transmitted to the wheel will be divided between the load spring 10 and the friction spring 15. The amount of load which is carried by the spring 15 may be adjusted, as, for example, by shims 40 beneath the flange 19. In this way the amount of compression of the friction spring at the normal intermediate position of the wheel-carrying member may be adjusted as desired with a corresponding change in the riding characteristics.

Figure 2:
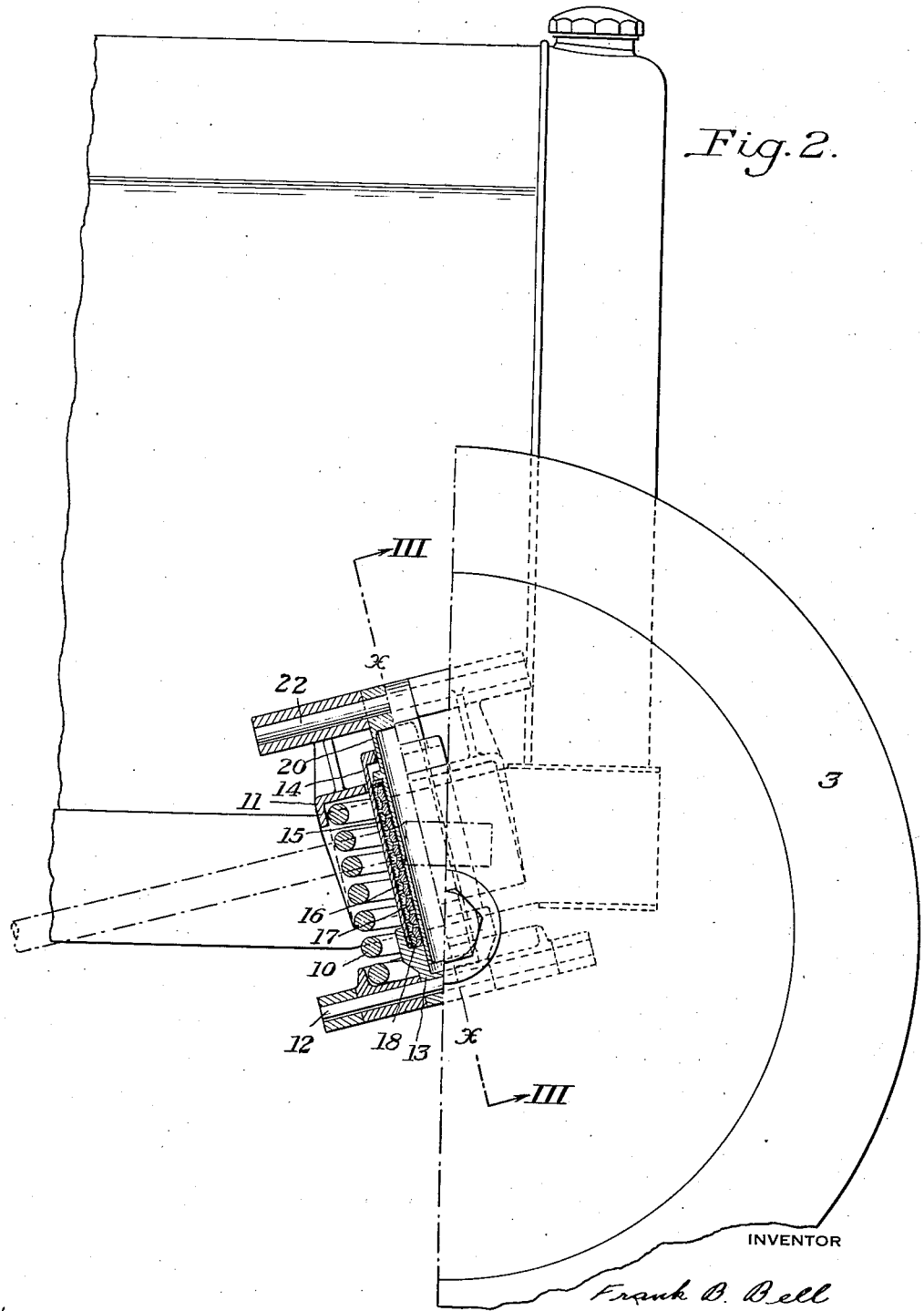
Figure 2 is a side elevation, partly broken away.

Referring to Figure 2, it will be noted that the axes of the several pivot pins for the links 7 and 8 are arranged at an angle to the horizontal so that the wheel-supporting member 6 moves in a plane $x-x$ which is at an angle to the vertical. It will also be noted that this plane $x-x$ extends upwardly and rearwardly with respect to the direction of travel of the vehicle. This arrangement greatly minimizes the amount of road shock which is transmitted to the vehicle frame. Generally speaking, any force exerted upon the wheel striking a bump in the road will have a rearward component and by reason of the backward tilting of the plane of movement of the wheel-supporting member, this component is absorbed in large measure by the springs 10 and 15.

My invention provides a relatively simple and inexpensive shock absorbing unit which may be readily applied to known wheel suspensions without the necessity for any material changes therein. It greatly improves the riding quality of the vehicle to which it is applied and also serves to eliminate or greatly reduce rattles in the wheel suspension mechanism.

I have illustrated and described a present preferred embodiment of the invention, but it will be understood that it is not limited thereto but may be otherwise embodied and practiced within the scope of the following claims.

I claim:

1. A wheel mounting for vehicles comprising a frame, a wheel-supporting member, a pair of spaced links connecting such member to the frame, a helical load spring interposed between a link and the frame, and a shock absorber extending between and connected to the links, the shock absorber lying within the load spring.

2. A wheel mounting for vehicles comprising a frame, a wheel-supporting member, a pair of spaced links connected at spaced points to the wheel-supporting member and at spaced points to the frame and supporting the wheel-supporting member from the frame, and a shock absorber extending between and connected to the links at points which have a differential movement less than the movement of the wheel-supporting member relative to the frame.

3. A wheel mounting for vehicles comprising a frame, a wheel-supporting member, a pair of spaced links connected at spaced points to the wheel-supporting member and at spaced points to the frame and supporting the wheel-supporting member from the frame, and a shock absorber extending between and connected to the links at points which have a different movement less than the movement of the wheel-supporting member relative to the frame, the spaced links supporting the wheel-supporting member independently of the shock absorber.

4. A wheel mounting for vehicles comprising a frame, a wheel-supporting member, a pair of spaced links connected at spaced points to the wheel-supporting member and at spaced points to the frame and supporting the wheel-supporting member from the frame, the links being of different effective lengths, and a shock absorber extending between and connected to the links intermediate their ends.

5. A wheel mounting for vehicles comprising a frame, a wheel-supporting member, a pair of spaced links connected at spaced points to the wheel-supporting member and at spaced points to the frame and supporting the wheel-supporting member from the frame, a load spring interposed between a link and the frame, and a shock absorber extending between and connected to the links at points which have a differential movement less than the movement of the wheel-supporting member relative to the frame.

6. A wheel mounting for vehicles comprising a frame, a wheel-supporting member, a pair of spaced links connected at spaced points to the wheel-supporting member and at spaced points to the frame and supporting the wheel-supporting member from the frame, and a shock absorber extending between and connected to the links, the shock absorber being connected to the links at points which have a differential movement less than the movement of the wheel-supporting member relative to the frame.

7. A wheel mounting for vehicles comprising a frame, a wheel-supporting member, a pair of spaced links connected at spaced points to the wheel-supporting member and at spaced points to the frame and supporting the wheel-supporting member from the frame, and a friction spring extending between and connected to the links intermediate their ends so as to be actuated upon differential movement between the links.

8. A wheel mounting for vehicles comprising a frame, a wheel-supporting member, a pair of spaced links connected at spaced points to the wheel-supporting member and at spaced points to the frame and supporting the wheel-supporting member from the frame, a pair of relatively movable members connected one to each link, said members having a differential movement less than the movement of the wheel-supporting member relative to the frame, and a shock absorbing spring biasing such members relative to one another.

9. A wheel mounting for vehicles comprising a frame, a wheel-supporting member, a pair of spaced links connected at spaced points to the wheel-supporting member and at spaced points to the frame and supporting the wheel-supporting member from the frame, a pair of relatively movable members connected one to each link, said members having a differential movement less than the movement of the wheel-supporting member relative to the frame, and a friction spring biasing such members relative to one another.

10. A wheel mounting for vehicles comprising a frame, a wheel support, a pair of spaced links connected at spaced points to the wheel support and at spaced points to the frame and supporting the wheel support from the frame, the wheel support and the links all constituting members movable relative to the frame, and a shock absorber extending between and connected to the links at points which have a differential movement less than the movement of the wheel support relative to the frame.

11. A wheel mounting for vehicles comprising a frame, a wheel support, a pair of spaced links connected at spaced points to the wheel support and at spaced points to the frame and supporting the wheel support from the frame, the wheel support and the links all constituting members movable relative to the frame, and a shock absorber extending between and connected to two of such members, the shock absorber being connected to such members at points which have a differential movement less than the movement of the wheel support relative to the frame.

12. A wheel mounting for vehicles comprising a frame, a wheel support, a pair of spaced links connected at spaced points to the wheel support and at spaced points to the frame and supporting the wheel support from the frame, the wheel support and the links all constituting members movable relative to the frame, and a shock absorber extending between and connected to two of such members, the shock absorber being connected to such members at points which have a differential movement less than the movement of the wheel support relative to the frame, the shock absorber including a friction spring.

13. A wheel mounting for vehicles comprising a frame, a wheel-supporting member, a pair of spaced links connecting such member to the frame, the links being pivoted to the frame in such manner that the wheel-supporting member moves in a plane at an angle to the vertical, and a shock absorber extending between and connected to the links at points which have a differential movement less than the movement of the wheel-supporting member relative to the frame.

14. A wheel mounting for vehicles comprising a frame, a wheel-supporting member, a pair of spaced links pivotally connecting such member to the frame, the links being so mounted that the wheel-supporting member moves in a plane extending upwardly and rearwardly with respect to the direction of travel of the vehicle, and a shock absorber extending between and connected to the links at points which have a differential movement less than the movement of the wheel-supporting member relative to the frame.

FRANK B. BELL.

CERTIFICATE OF CORRECTION.

Patent No. 2,070,775. February 16, 193

FRANK B. BELL.

It is hereby certified that error appears in the printed specification of the above numbered patent requiring correction as follows: Page 2, second column, line 12, claim 3, for the word "different" read differential; and that the said Letters Patent should be read with this correction therein that the same may conform to the record of the case in the Patent Office.

Signed and sealed this 23rd day of March, A.D. 1937.

(Seal)

Henry Van Arsdale
Acting Commissioner of Patents.